Figure 1:
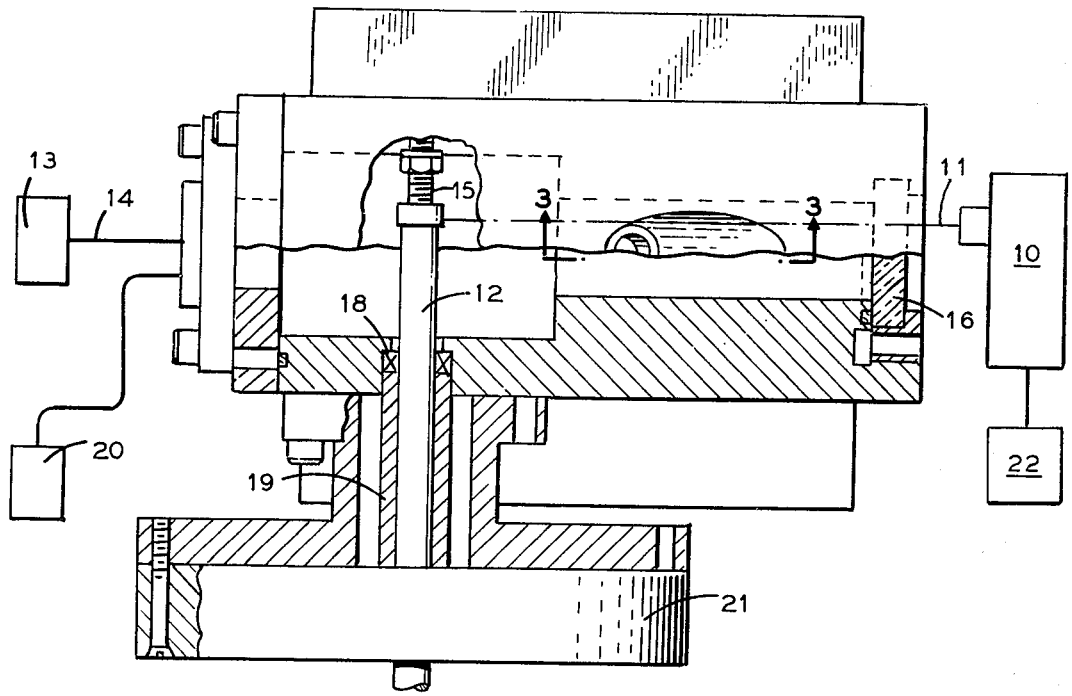

United States Patent [19]

Heer et al.

[11] 3,774,010
[45] Nov. 20, 1973

[54] PRESSURIZATION OF FUEL RODS BY LASER DRILLING AND SEALING

[75] Inventors: William Franklin Heer; Earl Victor DeCarli, both of Lynchburg, Va.

[73] Assignee: The Babcock & Wilcox Company, New York, N.Y.

[22] Filed: Jan. 8, 1971

[21] Appl. No.: 104,946

[52] U.S. Cl. .......................... 219/121 LM, 176/68
[51] Int. Cl. ............................................. B23k 9/00
[58] Field of Search .................. 219/121 L, 121 EB, 219/137, 72; 176/68; 264/.5

[56] References Cited
UNITED STATES PATENTS

| | | | |
|---|---|---|---|
| 3,045,108 | 7/1962 | Stone et al. | 219/137 |
| 3,033,972 | 5/1962 | Stedman | 219/137 X |
| 3,188,446 | 6/1965 | Ray et al. | 219/137 |
| 3,151,231 | 9/1964 | Steigerwald | 219/121 EM |
| 3,210,171 | 10/1965 | MacDonald | 219/121 LM |

FOREIGN PATENTS OR APPLICATIONS 2,015,784 4/1970 Germany .................. 219/121 L

OTHER PUBLICATIONS

"Laser Welding and Drilling Applications" Welding Journal, 2/71 presented June 1970, pp. 97–106.

Primary Examiner—J. V. Truhe
Assistant Examiner—George A. Montanye
Attorney—J. Maguire

[57] ABSTRACT

A method of pressurizing a presealed fuel rod containing nuclear fuel with an inert gas under pressure. A loaded fuel rod is inserted into a pressure chamber, the latter is sealed and a vacuum is applied. While maintaining the vacuum in the chamber, the fuel rod is punctured with a fine hole by means of a laser beam. The air inside the vessel is drawn out into the chamber until it reaches equilibrium therein. The chamber is then filled with an inert gas under pressure and this gas is forced inside the fuel rod through the aforesaid hole. When the pressure inside the fuel rod reaches equilibrium with the chamber, the hole is sealed by means of a laser beam and the fuel rod is removed from the chamber.

7 Claims, 3 Drawing Figures

PATENTED NOV 20 1973 3,774,010

INVENTORS
William F. Heer
Earl V. Decarli

*Maguire*
ATTORNEY

PRESSURIZATION OF FUEL RODS BY LASER DRILLING AND SEALING

This invention relates to the pressurization of fuel rods for specialized nuclear reactors.

More particularly, this invention relates to a method of pressurizing a presealed fuel rod of the loaded nuclear variety with an inert gas.

In recent times, due to the specified designs of certain nuclear reactors, it has become a requirement to provide fuel rods which are internally pressurized when they are to be used in the core of such reactors. The simplest approach to such a problem has been to load the fuel rods with reactive material of a nuclear nature and then to pressurize the same. However, this necessitates providing access to the interior of such rods after loading for the application of pressure.

In the past, preconditioned end caps were utilized for closing a fuel rod subsequent to loading. The end caps initially utilized for this operation each contained an access hole and after pressurization of each of the rods with an inert gas, an attempt was made to close or seal the access hole in the cap. However, prior to pressurization and sealing, the nuclear fuel in the rods would be exposed to environmental contamination of an atmospheric nature. The latter condition in the last analysis would degrade the performance of such rods in the core of the reactor unless many long and tedious precautions were taken to insure quality of the reactive material including the design of special equipment and the utilization of highly trained personnel to operate the same, all of which was additive to the cost of processing. Furthermore, it was found that the position of the access hole in separate caps of any particular batch were not always in the same location and this, of course, necessitated an orientation of some type during the sealing procedure. As a result, it was found extremely difficult to adequately insure proper closure of each of the access holes on a repetitive basis when a large number of such rods were to be sealed. Therefore, there was always some degree of doubt as to the presence of pressure in each of the rods unless an extremely tedious control program was utilized to insure the quality of the rods on a repetitive basis. The latter was unfortunately necessary because if, perchance, any fuel rod lack pressurization, it could render the rod inoperative for their designed purpose in certain nuclear reactors.

What is needed is a method of pressurizing a loaded fuel rod of the nuclear variety with an inert gas without encountering any of the difficulties of the art relative to the quality of product and the procedure of obtaining the same.

The subject invention answers the aforesaid needs of the art with special emphasis on a simple method of pressurizing such fuel rods with an inert gas which may be carried out with an optimum degree of efficiency on a repetitive basis within closely controled limits of quality relative to rods and their internal contents thereby insuring effective and total use of each of the products produced for their designed purpose.

It is therefore an object of this invention to provide a method for the insitu pressurization of loaded nuclear fuel rod with an inert gas having facileness in use under a wide variety of service conditions without exposure of the fuel to potential contamination.

Another object is the provision of a method wherein such fuel rod may be pressurized with an inert gas on a reliable basis without the need for numerous special handling techniques of a complicated nature thereby decreasing the manufacturing cycle and cost of processing.

A further object is the provision of a method of pressurizing nuclear fuel rods with an inert gas wherein the resultant product may be non-destructively inspected in situ for complete assurance of quality control relative to pressurization of such rods.

Figure 2:
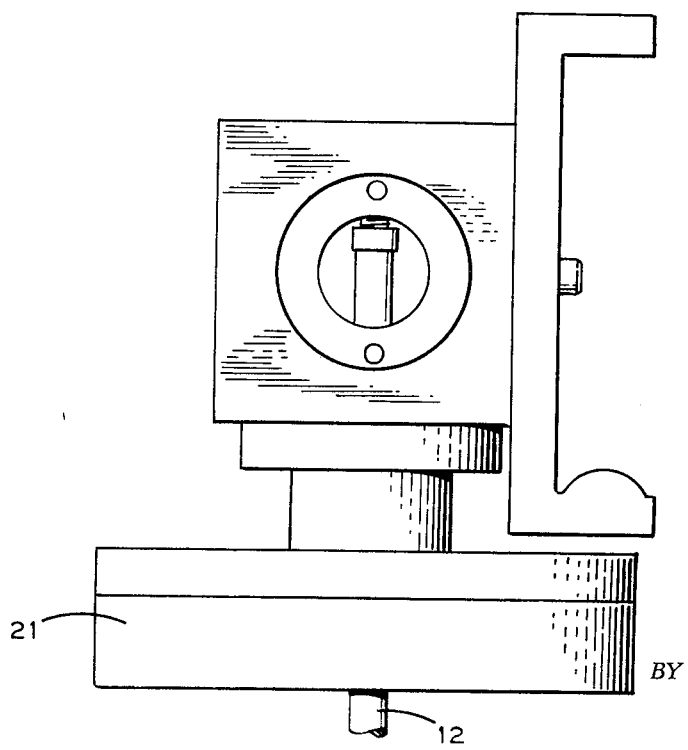
Figure 3:
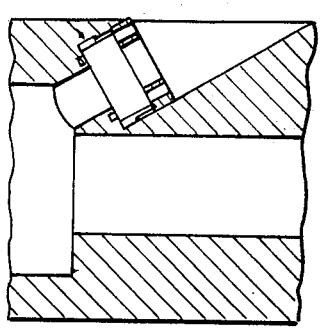

Other objects and many of the attendant advantages of the present invention will become better understood from a reading of the following detailed description taken with the accompanying drawings, wherein:

FIG. 1 is a top plan view of the chamber utilized in the process.
FIG. 2 is a front view of the device of FIG. 1.
FIG. 3 is a section taken on line 3—3 of FIG. 1.

Similar numerals relate to similar parts throughout the several views.

Broadly, the method of this invention is directed towards the pressurization of a sealed nuclear fuel rod with an inert gas under pressure by initially puncturing such fuel rod with a fine hole by means of a laser beam while it is in a chamber under vacuum and subsequently, while the rod is maintained in place, pressurizing such chamber to equilibrium and sealing such hole by means of the same laser.

More specifically, the process of this invention comprises positioning a sealed fuel rod of the loaded nuclear variety in a predetermined location in a closed chamber which is subsequently evacuated. At that time, a specific amount of light energy from a fixed laser source is applied to a definite location on the exterior of such rod until a fine hole is produced therein which communicates with the interior of such rod thereby allowing the same to be evacuated by the chamber. After the chamber has reached equilibrium, it is pressurized with an inert gaseous medium and again a specific amount of light energy of the same fixed laser beam source is reapplied to the external surface area around the periphery of the fine hole to seal the same. This technique is accomplished without movement of either the light source or the fuel rod after initial positioning of the same.

In the preferred embodiment, as shown in FIG. 1–3, one end of a nuclear fuel rod 12 is inserted into a pressure chamber against a permanent stop 15 which effectually positions the rod against forward movement. A seal type mechanism 21, of the plunger 19 and ring 18 variety is then pushed forward to seal the fuel rod in position against the stop 15 and to seal the pressure chamber against leakage thereby assuring control of the atmosphere in the chamber. At this point, a vacuum pump 13 which communicates with the interior of the chamber is activated and evacuates the latter chamber through line 14 to achieve a vacuum of low micron level, at which point, the pump is cut off. Highly acceptable results were obtained when a vacuum of 20 $u$ was maintained in the chamber at this stage of processing.

A laser source 10 secured in position relative to the chamber during processing is then activated by means of a power source 22 and a beam of light energy 11 of the laser variety is directed through a glass port 16 secured in the side of the chamber. This beam of light energy 11, as shown in FIG. 1, traverses the evacuated hollow chamber and impinges on the side of the fuel rod in the position desired until a fine hole is punctured therein. The permanent stop 15 aids in locating the position of the rod 12 and provides a consistently reliable method of assuring rods are drilled or punctured in the same location on a repetitive basis for each of the separate fuel rods in a batch or bundle.

The amount of energy necessary for drilling or puncturing a fine hole through the surface of the fuel rod may be mathematically calculated for various types of material. However, in each case, utilizing conventional laser equipment, the desired energy level may be achieved for drilling by varying voltage outputs, aperture openings and conventional lenses for focusing. The specific laser source utilized in the past was a Neodymium-glass laser system, Model 1200-2R, of Holobeam Inc. A wide variety of conventional nuclear fuel rods of differing materials may be penetrated or punctured by applying light energy of the laser variety in a range of between about 160 and about 740,000 joules per square centimeter. However, very acceptable results may be achieved when an energy level between about 13,000 and about 110,000 joules per square cm. are utilized for the production of such access into a sealed fuel rod of the loaded nuclear variety. In the preferred embodiment, optimum results were achieved, when about 52,360 joules of light energy per. sq. cm. was applied to puncture a fuel rod of the Zircaloy type.

Once a fine puncture is produced, which communicates with the interior of the sealed fuel rod, the pressure within the rod is withdrawn through the puncture into the chamber and this dramatically reduces the vacuum level in the same. The vacuum level of the chamber is monitored at all times during this processing stage and a variation such as this drastic reduction will immediately become evident and may be permanently recorded as evidence that a communicating puncture has been fully completed. In practice, approximately one atmosphere is present as internal pressure within the fuel rod and a large deflection on the vacuum guage is usually evidence of such release to the chamber. After equilibrium is again achieved in the chamber, the pump is reactivated to produce a vacuum of low micron level in the range of about 15 $u$ to further evacuate the residual gas in the chamber.

At this point, the vacuum source is deactivated and an inert gaseous medium 20 such as helium, argon, or a mixture thereof is allowed to enter the chamber under the pressure desired which, of course, will be above one atmosphere. In the past, pressures as high as 400 psi have proved to be highly acceptable with the conventionally designed fuel rods utilized in industry. Sufficient time is allowed to elapse to assure that the entire rod is pressurized and such lapse may be measured by a conventional time relay.

After equilibiium has been achieved in the chamber at the desired pressure level, the fixed laser source is again activated to seal the puncture while the rod remains in place. The size, depth, and surface configuration of the seal or weld may be easily controlled by varying the voltage output, aperture sizes, or lenses used for focusing the laser beam. In general, the light energy per unit area required for sealing will be substantially less than that required for drilling or puncturing. However, this may easily be achieved even though a constant energy generating source is utilized by enlarging the area of impingement of the surface of the rod by simply changing or interposing a conventional focusing lens between the source and the rod. It may also be accomplished by increasing the aperture size of the source or by decreasing the power input to the light source. If the latter action is taken, the voltage may be recorded as a permanent record for purposes of quality control. In practice, it has been found that satisfactory results were achieved when the seal or weld produced varied between a surface build-up having a depth of about 0.020 inches to a surface depression of about 0.003 inches.

At this point, the pressure in the chamber may be released through a conventional exhaust valve and the cycle will be complete. However, in many cases, for quality control purposes to insure that an effective seal has been made in the surface of the rod, it may be desirable to again evacuate the chamber to a vacuum of a low micron level. If a leak or imperfection is present in the seal or weld, it will again become very evident by a dramatic deflection on the vacuum gauge. If such is the case, the pressurization and sealing stages of the process may be repeated to insure the quality of the product.

After the pressure in the chamber has been brought to room condition, the pressurized fuel rod may be removed from the chamber by deactivating the seal around the rod by a simple pulling action on the plunger. Thus the cycle is complete and the rod is ready to be used in the core of a nuclear reactor.

The advantages of this method include the pressurization of a fuel rod without exposure of the internal reactive materials to potential contaminants such as a relatively impure atmosphere or agents of the cleansing type. The rods may be pressurized at any desired time during fabrication without dificulty or inconvenience and this may be accomplished without any special requirements for handling. Thus, the manufacturing cycle is decreased by minimizing operations for achieving such pressurized fuel rods.

Furthermore, the seal of weld may be non-destructively inspected with complete reliability thereby assuring pressure has been provided in such fuel rods and the rod is operative for its designed purpose. It is also insured for quality control purposes that the puncture or seal is achieved in a precise location on a repetitive basis when more than one rod is pressurized and that repair of defective rods may be effectively and efficiently accomplished in a simplified manner.

What is claimed is:

1. A sequential method of pressurizing a sealed fuel rod of the loaded nuclear variety in step wise order, Comprising:
    1. Positioning a sealed fuel rod having a nuclear fuel therein in a predetermined location in a closed chamber.
    2. Evacuating said chamber to provide a vacuum,
    3. Applying between about 160 and 740,000 joules of light energy of the laser variety per square centimeter to a desired location on the surface of said rod to produce a puncture which communicates with the interior of the same, purging said fuel rod through said puncture,
    4. Pressurizing said chamber to a pressure above atmospheric pressure, and 5. Reapplying said light energy to an enlarged area around the periphery of said puncture to seal the same.

2. The method of claim 1, wherein in step 3 said light energy is between about 13,000 and 110,000 joules per square centimeter.

3. The method of claim 1, wherein in step 3 about 52,360 joules per square centimeter is applied to said rod of the Zircaloy variety.

4. The method of claim 1, wherein between steps 3 and 4 said chamber is evacuated to 20 u and allowed to reach equilibrium prior to pressurization of said chamber.

5. The method of claim 1, wherein communication of said puncture with the interior of said rod as a result of step 3 further comprises the step of observing a reduction of the vacuum produced in said chamber by step 2.

6. The method of claim 1, wherein in step 4 said chamber is pressurized to 400 pounds per square inch prior to sealing said puncture.

7. The method of claim 1, wherein in a final step, said chamber is again evacuated after the sealing of said puncture in step 5.

* * * * *

UNITED STATES PATENT OFFICE
CERTIFICATE OF CORRECTION

Patent No. 3,774,010　　　　　　　　　Dated November 20, 1973

Inventor(s) William Franklin Heer, et al.

It is certified that error appears in the above-identified patent and that said Letters Patent are hereby corrected as shown below:

Column 3, line 21, cancel the entire line;
　　　　　line 22, cancel "joules per square centimeter".

Column 6, line 12, delete "* * * * *".

Insert the following:

8. A method of pressurizing a sealed fuel rod of the loaded nuclear variety comprising:
　　　　　positioning a sealed fuel rod having a nuclear fuel therein in a predetermined location in a closed chamber,
　　　　　evacuating said chamber to provide a vacuum,
　　　　　applying sufficient energy of the laser variety to a desired location on the surface of said rod to produce a puncture which communicates with the interior of the same purging said fuel rod through said puncture,
　　　　　pressurizing said chamber to a pressure above atmospheric pressure, and
　　　　　reapplying said light energy to an enlarged area around the periphery of said puncture to seal the same.

Signed and sealed this 16th day of April 1974.

(SEAL)
Attest:

EDWARD M. FLETCHER, JR.　　　　　　　　C. MARSHALL DANN
Attesting Officer　　　　　　　　　　　Commissioner of Patents